Patented Apr. 18, 1939

2,155,364

UNITED STATES PATENT OFFICE 2,155,364

COMPOUNDS OF THE PYRAZOLANTHRONE SERIES

Melvin A. Perkins, Milwaukee, and Clifford E. Carr, South Milwaukee, Wis., assignors to E. I. du Pont de Nemours & Company, Wilmington, Del., a corporation of Delaware No Drawing. Application February 24, 1936, Serial No. 65,416

4 Claims. (Cl. 260—312)

This invention relates to the preparation of new compounds of the pyrazolanthrone series, and more particularly to the preparation of 6-chloro-N-alkyl-1-9-pyrazolanthrones, 6-chloro-2-halogen-N-alkyl-1-9-pyrazolanthrones and the dipyrazolanthrone dyestuffs obtainable therefrom.

It has been found that 6-chloro-1-9-pyrazolanthrone can be fused with alcoholic potash according to the methods employed for preparing dipyrazolanthrone dyestuffs, to give products which on alkylation exhibit improved dyeing and printing properties over the corresponding dialkylated dipyrazolanthrones. They also exhibit improved fastness properties, particularly to washing, over the product heretofore obtained by direct chlorination of N-N'-dialkyl-dipyrazolanthornes. The presence of chlorine in the 6-6'-positions of the dialkyl-dipyrazolanthrone molecule has, therefore, been found to be desirable for it imparts to the dyestuff new and valuable properties. However, it has been found that in the alcoholic potash fusion of the 6-chloro-1-9-pyrazolanthrone by the methods generally employed for the preparation of the dipyrazolanthrone dyestuffs, a considerable amount of the chlorine is split off.

It is, therefore, an object of this invention to prepare new chlorine containing pyrazolanthrones which can be converted to dipyrazolanthrone dyestuffs without excessive loss of chlorine. It is a further object to prepare new and valuable halogen containing N-N'-dialkyl-dipyrazolanthrone dyestuffs. It is a still further object to provide processes for the manufacture of 6-chloro-N-alkyl-pyrazolanthrones which may also contain halogen in the 2-position, and for preparing 6-6'-dichloro-N-N'-dialkyl-dipyrazolanthrone dyestuffs therefrom.

We have found that 6-chloro-pyrazolanthrone, when alkylated prior to its condensation to the dipyrazolanthrone, can be subjected to the usual alcoholic alkali fusion and converted to the corresponding dipyrazolanthrone with the loss of but small quantities of chlorine. We have also found that the 6-chloro-N-methyl-pyrazolanthrone can be further halogenated to give the 2-6-dichloro-N-alkyl-pyrazolanthrone which in turn, when subjected to the usual vatting procedure, can be converted to 6-6'-dichloro-N-N'-dialkyl-dipyrazolanthrone without any appreciable loss of halogen from the 6-6'-positions. The presence of the N-alkyl group in the 6-chloro-pyrazolanthrone appears to facilitate the fusion, or otherwise retard the dechlorination which normally takes place during the alkaline condensation.

According to our invention, 6-chloro-1-9-pyrazolanthrone is alkylated in acidic medium and the resulting 6-chloro-N-alkyl-pyrazolanthrone subjected to an alkaline condensation to give the 6-6'-dichloro-N-N'-dialkyl-dipyrazolanthrone dyestuff. Alternatively the 6-chloro-N-alkyl-pyrazolanthrone may be halogenated to give the corresponding 2-halogen-6-chloro-N-alkyl-pyrazolanthrone. This dihalogen compound is then subjected to alkaline reduction, as for example a vatting procedure to give 6-6'-dichloro-N-N'-dialkyl-dipyrazolanthrone.

The following examples are given to more fully illustrate the invention. The parts used are by weight.

Example 1

Forty parts of 6-chloro-pyrazolanthrone are stirred into a mixture of 64 parts of methyl alcohol which has been mixed with 240 parts of 95% sulfuric acid (addition of methyl alcohol to sulfuric acid is made below 40° C.). This mixture is heated preferably under a reflux condenser to 165–170° C. and held at this temperature in an oil bath for a period of two to three hours, or until alkylation is complete.

When completely methylated, the solution is cooled to 100° C. and drowned in 2000 parts of cold water under agitation. It is filtered and washed acid free with cold water. The cake is slurried in 1% caustic soda solution at 90–95° C. for one-half hour, filtered, washed alkali-free and dried.

This crude product may be recrystallized from solvent naphtha to give a product melting at 208–211° C. (chlorine=13.12%). This product gives a clear, bright reddish-yellow solution in concentrated sulfuric acid, yellow in thin layers.

Example 2

Ten parts of 6-chloro-N-methyl-pyrazolanthrone as prepared in Example 1 are slurried in 50 parts of glacial acetic acid containing 10 parts of anhydrous sodium acetate. The reaction mixture is heated to 115–120° C. and a slow stream of gaseous chlorine is passed in at this temperature for a period of two hours or until a test sample, isolated and analyzed, gives theoretical chlorine for 2-6-dichloro-N-methyl-pyrazolanthrone. The reaction mass is cooled to 20° C., filtered and washed acetic acid free with cold water.

The yellow solid is dried at 100° C. and may be recrystallized from solvent naphtha, then from glacial acetic acid, to give a bright yellow powder melting at 263° C. This product gives an orange solution in concentrated sulfuric acid.

Example 3

Ten parts of 6-chloro-N-methyl-pyrazolanthrone as prepared in Example 1 are added slowly at 100° C. to a melt of 50 parts of caustic potash and 50 parts of (95%) ethyl alcohol (previously heated to 115–120° C. and cooled to 100° C.).

The fusion mass is held at 100° C. for a period of two hours and gives a greenish melt. This melt is drowned in 200 parts of cold water, heated to 70–80° C. under agitation and aerated until a spot-test shows complete oxidation. The aerated mass is filtered and washed alkali-free with hot water.

The fusion product when dried and extracted with hot nitrobenzene contains more than 10% chlorine and gives a yellowish-red color in concentrated sulfuric acid. It dyes in bright red shades from an intense greenish-blue vat and shows good fastness properties especially toward alkaline agents.

Example 4

Six parts of 2-6-dichloro-N-methyl-pyrazolanthrone in a finely divided form (as obtained for example by dissolving in sulfuric acid and reprecipitating by means of water) are slurried in 240 parts of cold water containing 12 parts of sodium hydroxide and 12 parts of sodium hydrosulfite. The vat is heated to 60° C. and held at this temperature for 15 minutes, preferably under an atmosphere of nitrogen. The vat is filtered at 60° C. and washed with a little hot dilute solution of sodium hydroxide and sodium hydrosulfite in water. The filtered solution is aerated under agitation at 60–70° C. until completely oxidized. The aerated solution is filtered and washed alkali-free with hot water. This product when dried is a red crystalline powder giving a yellowish-red solution in concentrated sulfuric acid and analyzes 12–13% chlorine. The product is substantially pure 6-6'-dichloro-N-N'-dimethyl-dipyrazolanthrone. It dyes similar to the vat dyestuff of Example 3 from an intense greenish-blue vat.

In place of methyl alcohol in the methylation of 6-chloro-pyrazolanthrone, ethyl alcohol may be used to give a corresponding ethyl derivative. The alkylation may be carried out in an inert solvent in the presence of a trace of mineral acid by means of dimethyl or diethyl sulfate. While in the alkylation step a temperature of 165–170° C. is preferred, lower temperatures may be employed.

In place of gaseous chlorine other halogenating agents such as sulfuryl chloride or bromine may be used.

In the fusion of 6-chloro-N-methyl-pyrazolanthrone other alcohols and alkalies such as methyl alcohol and caustic soda may be used, and the temperature may be varied between reasonable limits. In general, temperatures of about 100° C. are necessary to bring about dyestuff formation, while temperatures above 130° tend to produce excessive dehalogenation. The temperatures used will vary depending upon the particular alcohol employed.

In the vatting of 2-6-dichloro-N-methyl-pyrazolanthrone the temperatures and quantities of reactants may be varied without materially affecting the final product. 2-bromo-6-chloro-N-methyl- or ethyl-pyrazolanthrone may be used in place of the 2-6-dichloro compound. They may be prepared by bromination of the 6-chloro-N-alkyl-pyrazolanthrone.

The 6-chloropyrazolanthrones used in the above examples may be prepared by the following procedure (see copending application 65,430):

9 parts of 6-chloroanthraquinone-1-hydrazine obtained by the diazotization and reduction of 1-amino-6-chloroanthraquinone are dissolved in 60 parts of concentrated sulfuric acid, and the whole is heated to about 100° C. for several hours. It is then cooled and diluted with water to an acid concentration of about 50–55%. The precipitated 6-chloropyrazolanthrone is then filtered off, washed with 50% sulfuric acid, then with water until acid free. When dried and pulverized it is a greenish olive powder soluble in concentrated sulfuric acid with a pale yellow color. On recrystallization from nitrobenzene it has a melting point of 273.5–275° C.

We claim:
1. A 6-chloro-N-alkyl-pyrazolanthrone.
2. A 6-chloro-2-halogen-N-alkyl-pyrazolanthrone.
3. 6-chloro-N-methyl-pyrazolanthrone.
4. 2-6-dichloro-N-methyl-pyrazolanthrone.

MELVIN A. PERKINS.
CLIFFORD E. CARR.